March 1, 1966　　J. J. H. CROYMANS ETAL　　3,238,399
SELF-STARTING LOW POWER SYNCHRONOUS STEP MOTOR
Filed July 21, 1961　　　　　　　　　　　　　　　　4 Sheets-Sheet 1

INVENTOR
JACQUES J. H. CROYMANS
JOHANNES F. BRANDWIJK
BY
AGENT

March 1, 1966  J. J. H. CROYMANS ETAL  3,238,399
SELF-STARTING LOW POWER SYNCHRONOUS STEP MOTOR
Filed July 21, 1961  4 Sheets-Sheet 3

INVENTOR
JACQUES J.H. CROYMANS
JOHANNES F. BRANDWIJK
BY
AGENT

March 1, 1966   J. J. H. CROYMANS ETAL   3,238,399
SELF-STARTING LOW POWER SYNCHRONOUS STEP MOTOR
Filed July 21, 1961   4 Sheets-Sheet 4

INVENTOR
JACQUES J.H. CROYMANS
JOHANNES F. BRANDWIJK
BY
AGENT

United States Patent Office 3,238,399
Patented Mar. 1, 1966

3,238,399
SELF-STARTING LOW POWER SYNCHRONOUS STEP MOTOR
Jacques Johannes Hendrik Croymans and Johannes Frerik Brandwijk, both of Emmasingel, Eindhoven, Netherlands, assignors to North American Philips Company, Inc., New York, N.Y., a corporation of Delaware
Filed July 21, 1961, Ser. No. 125,810
Claims priority, application Netherlands, July 26, 1960, 254,261
13 Claims. (Cl. 310—46)

This invention relates to selfstarting synchronous motors, more particularly to step motors of low power comprising two co-axially arranged stators and coils having pole plates with stator poles one on each side. The stator poles coact with permanent magnet N-poles or S-poles of at least one rotor, while the phase displacement between the fluxes of the rotor poles and the associated poles of the first stator are shifted by about 90° relative to the phase displacement between the fluxes of the rotor poles and the poles of the second stator. The invention is characterized in that each coil comprises two coil halves.

This results in a universal motor which may be used either as a synchronous motor or as a step motor with $n$ steps and with $2n$ steps.

In the first case, the motor can operate as a capacitor motor supplied with alternating current provided each two coil halves are connected in series.

In the second case, the coil halves, connected in series, may be supplied with pulses.

In the third case, according to another feature of the invention, the four coil halves may be supplied with pulses of equal polarity relatively shifted by 90°. The pulses may be supplied either electronically or by mechanical means, for example, by means of collectors or switches.

In order that the invention may be readily carried into effect, it will now be described in detail, by way of example, with reference to the accompanying diagrammatic drawing, in which.

Figure 1:
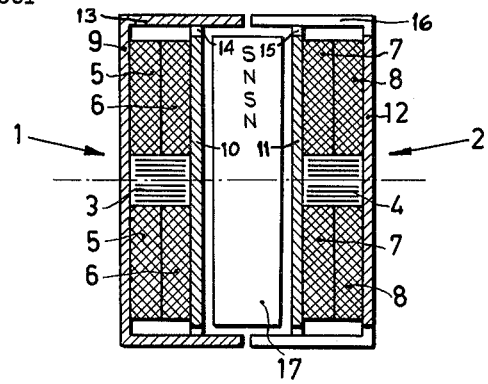
FIGURE 1 shows the motor according to the invention.
Figure 4:
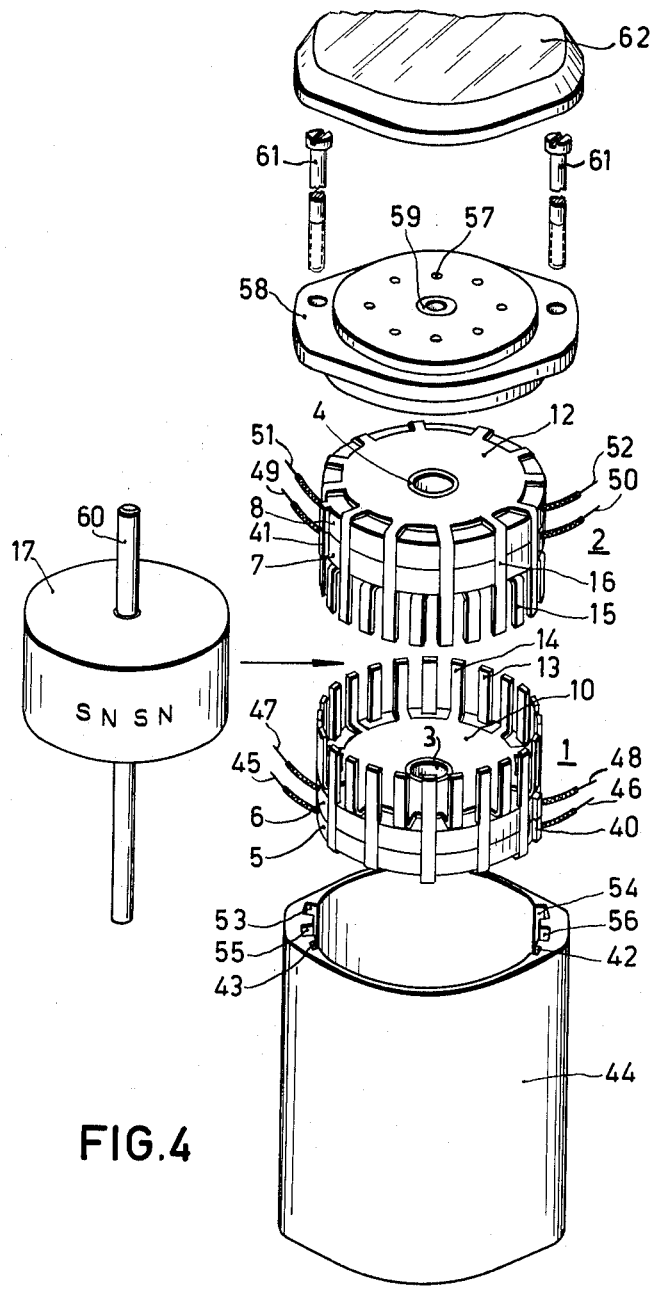
FIGURE 4 shows an exploded view of the motor according to the invention.

In FIGURES 1 and 4 the left stator 1 and the right stator 2 are provided with cores 3 and 4, respectively. Each core carries two coils, 5, 6 and 7, 8 respectively, having on their sides pole plates 9, 10 and 11, 12, respectively, with pole teeth 13, 14 and 15, 16, respectively.

The permanent magnet rotor is indicated by 17. The number of pairs of poles is equal to that of the stators.

The stators 1 and 2 are provided with keys 40 and 41 which slide in grooves 42 and 43, respectively, in the housing 44. The grooves are arranged so that the teeth of the stators 1 and 2 are relatively shifted by 90 electrical degrees.

Although in the example shown the teeth of the stators 1 and 2 are relatively shifted by 90°, it will be evident that the stator teeth may alternatively be aligned if use is made of two rotors having their poles relatively displaced by 90°.

The coils 5, 6 and 7, 8 have two connecting terminals 45/46, 47/48 and 49/50, 51/52, respectively, which extend through the grooves 53 and 54 to the connections 57 in the bearing plate 58. The bearing plate 58 is also provided with a bearing 59 in which the rotor shaft 60 is rotatably mounted. The bearing plate 58 can be fixed to the housing 44 by means of screws 61 which extend through the grooves 55 and 56. The connections 57 in the bearing plate 58 are covered by a cap 62. Though on each stator two separate coils are mounted it will be evident that this is only a matter of constructive detail and that it is equally possible to arrange the windings on a single core in a manner known per se.

Figure 2:
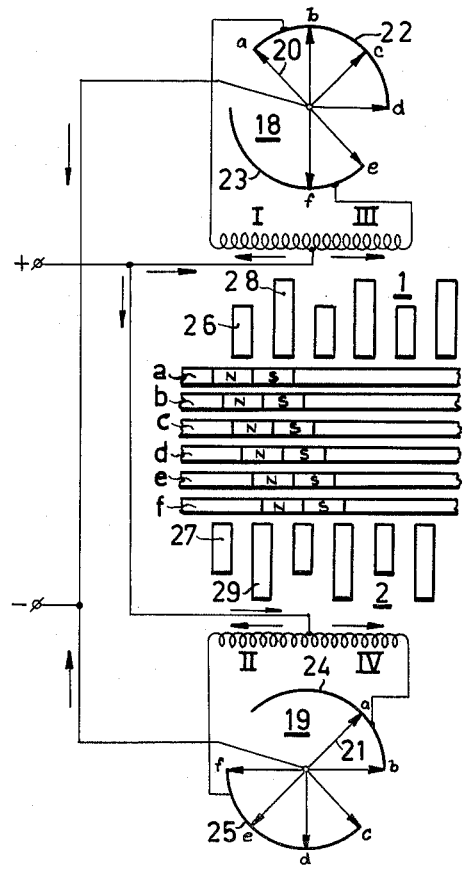
FIGURE 2 shows the supply and the operation of the motor as a step motor with $2n$ steps.

FIGURE 2 is an exploded view of the teeth of the stators 1 and 2 and of the rotor 17. Six positions of the rotor 17 of FIGURE 1 are shown for a step motor with $2n$ steps.

The coils of the stators are indicated by I, III and II, IV, respectively. The pole pieces 26, 28 of stator 1 are shown relatively off-set from the pole pieces 27, 29 of stator 2, preferably by an angle of 90°.

The figure also shows two rotary switches or collectors 18 and 19, each comprising a switching arm 20 and 21, respectively, and two contact rings 22, 23 and 24, 25, respectively, each covering an arc of 135°. The switching arms are coupled together and relatively shifted by 90°. The switching arms are connected, for example, to the negative terminal of a direct voltage source and the center tappings of the coils are connected to the positive terminal of said direct-voltage source. The operation of the device is as follows:

In the first or "$a$" position of the rotary switches 18 and 19 shown, poles 26 and 27 are energized by the coils I and IV, for example, in a manner such that both are south poles and 28 and 29 are north poles. The N-pole of the rotor in position $a$ is thus situated in the illustrated intermediate position between poles 26 and 27. The coils III and II are not energized at this time since the circuits from rings 23 and 25, respectively, to the negative terminal of the voltage source are both open in the "$a$" position of rotary switches 18 and 19.

It is assumed that the switching arms are turned in a clockwise direction.

In the next or "$b$" position of the arm 20, the pole 26 is still S due to the current still flowing in the coil I. However, the arm 21 now leaves the ring 24 and the coil IV is currentless. Thus, the rotor is turned into the position $b$ with its N-pole directly opposite pole 26. Coils III and II also remain currentless.

In the third or "$c$" position of the arm 20, the pole 26 is still S and pole 28 is still N since arm 20 still contacts ring 22. However, the coil II is now energized due to the contact of the arm 21 with the ring 25 so that the pole 29 acquires S- instead of N-polarity and hence the N-pole of the rotor is displaced to an intermediate position as indicated by $c$.

In its fourth or "$d$" position, the arm 20 leaves the ring 22 so that the coil I becomes currentless. Pole 29 is still a S-pole due to current flow in coil II by means of arm 21 and ring 25. The N-pole of the rotor is now displaced to the position $d$ directly opposite pole 29.

In the fifth or "$e$" position, the arm 20 makes contact with the ring 23 so that the coil III is energized and the polarities of the associated stator poles are changed, that is to say the pole 28 becomes an S-pole, while pole 29 still remains S. Consequently, the rotor is displaced to the position indicated by $e$, in which the N-pole assumes an intermediate position between the S-poles 28 and 29.

In the sixth or "$f$" position of the arm 20, the pole 28 is still S due to the current flow in coil III. However, the arm 21 now leaves the ring 25 so that the coil II becomes currentless and the pole 29 is no longer energized. The rotor then assumes a position $f$ with its N-pole directly opposite the S-pole 28.

Thus, the coils I–IV, I, I–II, II, II–III and III have successively been energized and by going on in this manner, the coils III–IV, IV and IV–I will be energized so that the cycle is completed. Owing to the intermediate positions it is thus achieved that, instead of $n$ steps, $2n$ steps are possible.

When using two separate rotors, the stator 2 may be turned with the poles in the same direction as those of the stator 1.

The angle of rotation of the arms 20 and 21 may be determined in connection with the number of steps desired.

Figure 3A:
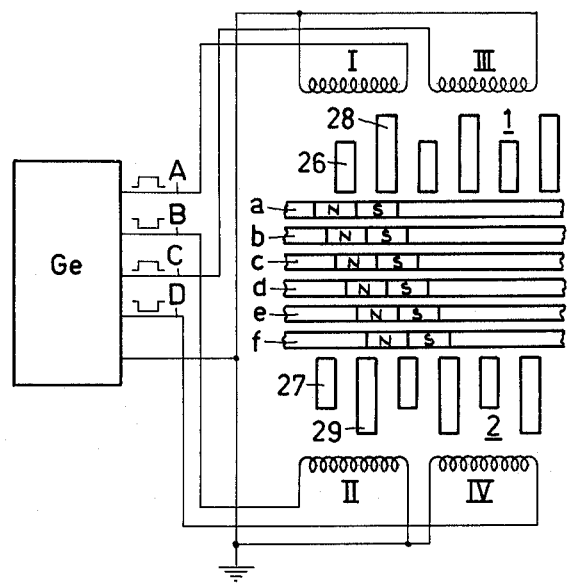
FIGURE 3a shows the supply and the operation of the motor as a step motor with $2n$ steps energized with positive and negative pulses according to FIGURE 3b.
Figure 3B:
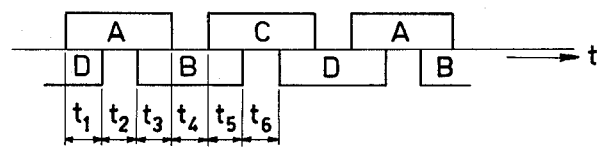

FIGURE 3a shows a circuit in block form which illustrates the supply and operation of a motor according to the invention as a step motor with $2n$ steps and which is supplied with positive and negative pulses. $Ge$ indicates a generator in block form which generates positive and negative pulses which are supplied to the coils of the motor. The positive pulses A are supplied to coil I, the negative pulses B to coil II, the positive pulses C to coil III and the negative pulses D to coil IV, in a sequence shown in FIGURE 3b. It will of course be obvious that if the connections between pulse generator $Ge$ and coils II and IV are reversed, all four coils may be supplied with pulses of the same polarity with equally good operating results. During the time $t_1$ poles 26 and 27 are energized by the coil halves I and IV, for example, in a manner such that both are S-poles and 28 and 29 are N-poles. The N-pole of the rotor in position $a$ is thus situated in the illustrated intermediate position between poles 26 and 27. In the next position occurring during the time $t_2$ the pole 26 is still S due to the pulse A supplied to coil I, pulse D being ended and coil IV being currentless. Thus the rotor is turned into the position $b$ with its N-pole directly opposite pole 26. In the third position during the time $t_3$ the pole 26 is still S and pole 28 is N. However, the coil II is energized due to the pulse B so that the pole 29 acquires S- instead of N-polarity, and hence the N-pole of the rotor is displaced to an intermediate position as indicated by $c$.

In the fourth position, during the time $t_4$, the coil I becomes currentless and the N-pole of the rotor is displaced to the position $d$ directly opposite pole 29 since pole 29 is still a S-pole due to the pulse B in coil II.

In the fifth position, during the time $t_5$, the coil III is energized by pulse C and the polarities of the associated stator poles have been changed, that is to say the pole 28 became a S-pole while pole 29 still remains S. Consequently, the rotor is displaced to the position indicated by $e$ in which the N-pole occupies an intermediate position between the S-poles 28 and 29.

In the sixth position, during the time $t_6$, the pole 28 is still S due to the pulse C supplied to coil III. At this time, the pulse B has ended so that the coil II becomes currentless and the pole 29 is no longer energized. The rotor now occupies the position $f$ with its N-pole directly opposite the pole 28.

Thus, the coil halves I-IV, I, I–II, II, II–III and III have successively been energized and by going on in this manner, the coils III–IV, IV and IV-I are energized so that the cycle is completed and the motor has made $2n$ steps.

Figure 5:
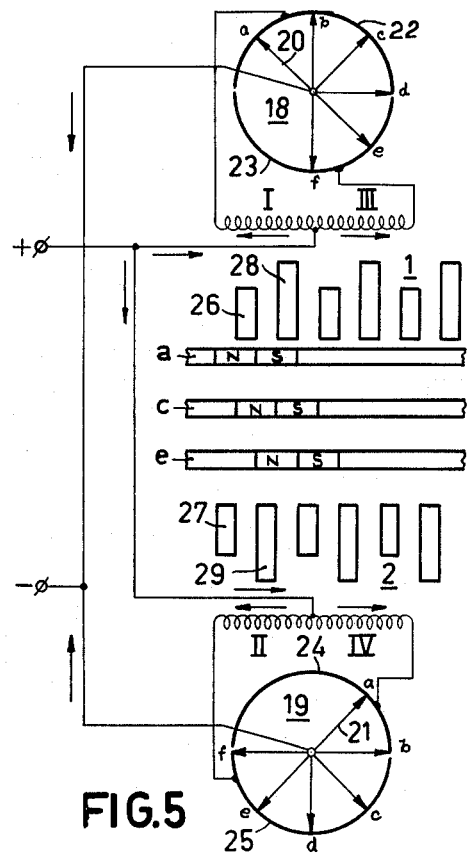
FIGURE 5 shows a circuit diagram to illustrate the operation of the motor as a step motor with $n$ steps.

In FIGURE 5 the circuit diagram for the operation of a motor according to the invention with $n$ steps is shown. The only difference from FIGURE 2 is that each of the contact rings 22, 23 and 24, 25, respectively, now covers an arc of 180°. As a result, in the energizing cycle of the coils, the positions 2, 4, 6 and 8 of the contact arm wherein only one coil is energized are eliminated, and so are the corresponding positions of the rotor $b, d, f$ and $h$.

The figure shows again the two rotary switches or collectors 18 and 19, each comprising a switching arm 20 and 21, respectively, and two contact rings 22, 23 and 24, 25, respectively, each covering an arc of 180°. The switching arms are coupled together and relatively shifted by 90°. The switching arms are connected, for example, to the negative terminal of a direct voltage source and the center tappings of the coils are connected to the positive terminal of said direct-voltage source. The operation of the device is as follows:

In the "$a$" position shown, poles 26 and 27 are energized by the coil halves I and IV, for example, in a manner such that both are S-poles and 28 and 29 are N-poles. The N-pole of the rotor in position $a$ is thus situated in the illustrated intermediate position between 26 and 27.

It is assumed that the switching arms are turned in a clockwise direction.

In the second or "$c$" position of the arm 20, the pole 26 is still S and 28 is N. However, the coil II now is energized due to the contact of the arm 21 with the ring 25, so that the pole 29 acquires S- instead of N-polarity and hence the N-pole of the rotor is displaced to an intermediate position as indicated by $c$.

In the third or $e$ position, the arm 20 makes contact with the ring 23 so that the coil half III is energized and the polarities of the associated stator poles are changed, that is to say the pole 28 becomes a S-pole. Arm 21 still contacts ring 25 and pole 29 therefore remains S. Consequently, the rotor is displaced to the position indicated by $e$, in which the N-pole assumes an intermediate position between the S-poles 28 and 29.

Thus, the coil halves I–IV, I–II, II–III have successively been energized and by going on in this manner, the coil halves III–IV, and IV–I are energized so that the cycle is completed. Now by eliminating the intermediate position, instead of $2n$ steps, $n$ steps are possible.

Figure 6:
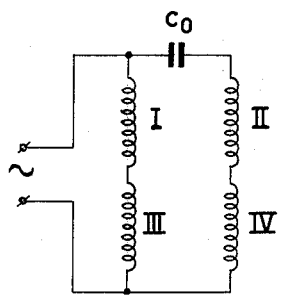
FIGURE 6 shows a circuit diagram to illustrate the connection of coils when the motor is operated as a synchronous motor.

FIGURE 6 shows the connection of the coils when the motor is used as an ordinary self-starting synchronous motor in which the 90° phase-shift of the current through the coils II and IV relative to the current through the coils I and III is effected by a capacitor $Co$.

It will be evident that the stator poles may alternatively be provided in known manner at the inner peripheries of the coil.

What is claimed is:

1. A self-starting synchronous motor comprising first and second coaxially mounted stator elements, each of said stator elements comprising a magnetic core and a coil comprising first and second coil elements, each of said coils being provided with toothed pole plates of magnetic material, means for supplying energizing currents to said coil elements in a predetermined sequence to selectively energize said coil elements, a permanent magnet rotor having a plurality of north and south poles, alternately arranged about its circumference and rotatably mounted in magnetic coupling arrangement with said first and second stator elements, the stator poles of said first and second stator elements being spatially shifted relative to one another by approximately 90 electrical degrees, said energizing means supplying energizing currents to each of said stator coils which are approximately 90 degrees out of phase with each other.

2. A synchronous step motor comprising first and second coaxially mounted stator elements, said first stator element comprising a magnetic core and a first coil comprising first and second coil elements and said second stator element comprising a magnetic core and a second coil comprising third and fourth coil elements, each of said coils being provided with toothed pole plates of magnetic material which provide a plurality of alternately arranged north and south poles arranged in a circle, a permanent magnet rotor having a plurality of north and south poles alternately arranged about its circumference and rotatably mounted in magnetic coupling arrangement with said first and second stator elements, the stator poles of said first and second stator elements being spatially shifted relative to one another by approximately 90 electrical degrees, and means for selectively energizing said coil elements with unidirectional current signals successively phase-shifted by approximately 90 degrees to step said motor.

3. A synchronous step motor comprising first and second coaxially mounted stator elements, each of said stator elements comprising a magnetic core and a coil comprising first and second coil elements, each of said coils being provided with toothed pole plates of magnetic material, a permanent magnet rotor having a plurality of north and south poles alternately arranged about its circumference and rotatably mounted in magnetic coupling arrangement with said first and second stator elements, the stator poles of said first and second stator elements being spatially shifted relative to one another by approximately 90 electrical degrees, and a source of electrical energy for selectively energizing each of said coil elements with unidirectional current signals which are approximately 90 degrees out of phase, said source periodically supplying substantially zero current to each of said coils for a predetermined time period during a stepping cycle.

4. Apparatus as described in claim 3 wherein said energy source supplies a periodic square wave type current signal to each coil element which has a zero level for a predetermined time of at least one quarter cycle of said energy source.

5. Apparatus as described in claim 3 wherein each of said stator element coils are positioned on opposite sides of said rotor.

6. Apparatus as described in claim 3 wherein said first and second coil elements of each of said first and second stator coils is arranged to produce first and second stator fluxes in each stator element which are in opposite directions.

7. Apparatus as described in claim 3 wherein the number of pairs of rotor poles equals the number of pairs of poles of a stator element.

8. A synchronous step motor comprising first and second coaxially mounted stator elements, each of said stator elements comprising a magnetic core and a coil comprising first and second coil elements, each of said coils being provided with toothed pole plates of magnetic material, a permanent magnet rotor having a plurality of north and south poles alternately arranged about its circumference and rotatably mounted in magnetic coupling arrangement with said first and second stator elements, the stator poles of said first and second stator elements being spatially shifted relative to one another by approximately 90 electrical degrees, and a source of electrical energy for selectively supplying periodic bi-valued energizing currents to said coil elements which are approximately 90 degrees out of phase, one value of said energizing currents being substantially zero current, said rotor and said stator poles coacting to produce a plurality of magnetically stable rotor positions during each cycle of said periodic energizing current.

9. A synchronous step motor comprising first and second coaxially mounted stator elements, said first stator element comprising a magnetic core and a first coil comprising first and second coil elements, said second stator element comprising a magnetic core and a second coil comprising third and fourth coil elements, each of said coils being provided with toothed pole plates of magnetic material which provide a plurality of alternately arranged north and south poles arranged in a circle, a permanent magnet rotor having a plurality of north and south poles alternately arranged about its circumference and rotatably mounted in magnetic coupling arrangement with said first and second stator elements, the stator poles of said first and second stator elements being spatially shifted relative to one another by approximately 90 electrical degrees, a source of electrical energy for selectively supplying periodic unidirectional energizing currents of a first polarity to said first and second coil elements and periodic unidirectional energizing currents of the opposite polarity to said third and fourth coil elements, said energizing currents being successively phase-shifted by approximately 90 degrees.

10. A synchronous step motor comprising first and second coaxially mounted stator elements, said first stator element comprising a magnetic core and a first coil comprising first and second coil elements, said second stator element comprising a magnetic core and a second coil comprising third and fourth coil elements, each of said coils being provided with toothed pole plates of magnetic material which provide a plurality of alternately arranged north and south poles arranged in a circle, a permanent magnet rotor having a plurality of north and south poles alternately arranged about its circumference and rotatably mounted in magnetic coupling arrangement with said first and second stator elements, the stator poles of said first and second stator elements being spatially shifted relative to one another by approximately 90 electrical degrees, a source of cyclic sequentially occurring first, second, third and fourth pulsating signals each having a duration less than one half cycle, each of said pulsating signals being selectively supplied to individual ones of said coil elements to step said motor.

11. Apparatus as described in claim 10 wherein successively occurring signals are of opposite polarity and wherein said first and third pulsating signals are selectively supplied to individual coil elements of said first stator element and said second and fourth pulsating signals are selectively supplied to individual coil elements of said second stator element.

12. A self-starting synchronous motor comprising first and second coaxially mounted stator elements, each of said stator elements comprising a magnetic core and a coil comprising first and second coil elements, each of said stator elements further comprising a number of spaced magnetic pole pieces, means for supplying unidirectional energizing current pulses to said coil elements which are approximately 90 degrees out of phase, a permanent magnet rotor having a plurality of north and south poles alternately arranged about its circumference and rotatably mounted in magnetic coupling arrangement with said first and second stator elements so that a phase displacement of approximately 90 degrees exists between the phase relationship of said rotor poles with respect to the stator poles of said first and second stator elements.

13. A synchronous step motor comprising first and second spaced outer magnetic stator members coaxially mounted, each of said stator members comprising a magnetic core having a number of spaced magnetic pole pieces about its periphery and a coil comprising first and second coil elements for producing alternate north and south poles in said pole pieces, means for selectively energizing said coil elements in a given sequence with unidirectional currents, a rotably mounted permanent magnet rotor having a plurality of north and south poles arranged about its circumference, said rotor being concentrically mounted within said first and second stator members in magnetic coupling relationship therewith so that a phase displacement of approximately 90 degrees exists between the phase relationship of said rotor poles with respect to the stator poles of said first and second stator elements.

References Cited by the Examiner

UNITED STATES PATENTS 2,814,746  11/1957  Boerdijk _____ 310—164

ORIS L. RADER, *Primary Examiner.*

MILTON O. HIRSHFIELD, DAVID X. SLINEY,
*Examiners.*